(12) United States Patent
Beville

(10) Patent No.: US 8,388,347 B2
(45) Date of Patent: Mar. 5, 2013

(54) SYSTEMS AND METHODS FOR SIMULATING EFFECTS OF AGE-RELATED COGNITIVE OR PHYSICAL DECLINE

(75) Inventor: Paula Kay Beville, Marietta, GA (US)

(73) Assignee: Second Wind Dreams, Inc., Marietta, GA (US)

( * ) Notice: Subject to any disclaimer, the term of this patent is extended or adjusted under 35 U.S.C. 154(b) by 1234 days.

(21) Appl. No.: 12/193,214

(22) Filed: Aug. 18, 2008

(65) Prior Publication Data
US 2010/0041003 A1   Feb. 18, 2010

(51) Int. Cl.
*A63B 69/00* (2006.01)
*G09B 9/00* (2006.01)
*G09B 23/28* (2006.01)

(52) U.S. Cl. ........................... 434/247; 434/262

(58) Field of Classification Search ............... 434/247
See application file for complete search history.

(56) References Cited

U.S. PATENT DOCUMENTS

| | | | | |
|---|---|---|---|---|
| 3,648,647 A * | 3/1972 | Joy | | 116/205 |
| 4,084,265 A * | 4/1978 | Anfelt | | 2/163 |
| 4,733,413 A * | 3/1988 | Dykstra | | 2/169 |
| 5,054,126 A * | 10/1991 | Rivkin | | 2/16 |
| 5,365,608 A * | 11/1994 | Flick | | 2/168 |
| 5,442,816 A * | 8/1995 | Seketa | | 2/161.7 |
| 5,448,777 A * | 9/1995 | Lew | | 2/161.7 |
| 5,727,257 A * | 3/1998 | Chen | | 2/161.1 |
| 5,794,266 A * | 8/1998 | Han | | 2/159 |
| 5,983,395 A * | 11/1999 | Lei | | 2/159 |
| 7,487,553 B2 * | 2/2009 | Price | | 2/161.1 |
| 7,802,314 B2 * | 9/2010 | Cohen | | 2/161.1 |
| 2006/0057232 A1 * | 3/2006 | Hirsch | | 424/736 |
| 2006/0205526 A1 * | 9/2006 | Whitehead et al. | | 2/161.1 |

OTHER PUBLICATIONS

The Suit That Makes You Feel Old. BBC News [Thurs. Aug. 5, 2004] retrieved Aug. 31, 2011 [retrieved from BBC NEWS website] <URL http://news.bbc.co.uk/2/hi/health/3538220.stm>.*
Japan Aging Suit Puts Car Makers in Senior Circuit. Reuters [Apr. 17, 2008], retrieved Sep. 12, 2011 [retrieved from Asiaone Digital via Internet] <URL http:digital.asiaone.com/Digital/News/Story/AlStory20080417-60330.html>.*
Mobilistrictor Restricting Third Age Bodysuit [Feb. 2, 2007] www.mobilistrictor.co.uk website [retrieved Aug. 31, 2001 from Internet Archive Wayback Machine] <URL http://web.archive.org/web/20110202210005/http://www.mobilistrictor.co.uk>.*

(Continued)

*Primary Examiner* — Nikolai A Gishnock
(74) *Attorney, Agent, or Firm* — Kilpatrick Townsend & Stockton LLP

(57) ABSTRACT

Certain aspects and embodiments of the present invention provide a system for allowing a user to experience a simulation of an age-related medical condition. The system can include eyewear, footwear, handwear, and an audio recording. The eyewear can include two colored lenses. Each lens includes a marking that can at least partially bock central vision of the user and a lens sideguard that can at least partially block peripheral vision of the user. The footwear includes a surface that can be located adjacent to a sole of the user. The surface includes protrusions that can at least indirectly contact the sole. The handwear can impair physical sensory of the user. The audio recording is stored on a medium and includes voiced instructions and static for a first pre-set time and static for a second pre-set time. The voiced instruction identifies home-based tasks for the user to perform during the second pre-set time while wearing the eyewear, footwear, and handwear.

13 Claims, 7 Drawing Sheets

OTHER PUBLICATIONS

Inside MIT's 'Age Suit'. Boston.com [Mar. 23, 2009] retrieved Aug. 31, 2011 [retrieved from the Boston Globe website using the Internet] <URL http://www.boston.com/business/technology/articles/2009/03/23/agesuit> discloses the MIT Aging Labs' age suit in graphic form.*

Kroemer, Karl H . E . 'Extra-Ordinary' Ergonomics; How to Accommodate Small and Big Persons, The Disabled and Elderly, Expectant Mothers, and Children. CRC Press 2005, Ch. 6; pp. 127-161. Print ISBN: 978-0-8493-3668-3; eBook ISBN: 978-0-203-02524-6; DOI: 10.1201/9780203025246.ch6.*

Fozard et al., "Optimizing Adult Development: Ends and Means of an Applied Psychology of Aging," *American Psychologist*, Nov. 1978, pp. 975-989.

Namazi et al., "Visual Barriers to Prevent Ambulatory Alzheimer's Patients from Exiting Through an Emergency Door," *The Gerontologist*, 1989, vol. 29, No. 5, pp. 699-702.

Williams, "Complete Guide to Aging and Health," *The American Geriatrics Society*, 1995, pp. 187-189, 282-283.

Quillen, "Common Causes of Vision Loss in Elderly Patients " *American Family Physician*, Jul. 1999, vol. 60, No. 1, pp. 99-108.

Beville, "The Virtual Dementia Tour Manual," 2001.

Arguelles et al., "Caregivers' Judgments of the Functional Abilities of the Alzheimer's Disease Patient: Impact of Caregivers' Depression and Perceived Burden," *Journal of Geriatric Psychiatry & Neurology*, Summer 2001 , vol. 14, pp. 91-98.

Debaggio, "Losing My Mind, an Intimate Look at Life with Alzheimer's," *New York: The Free Press*, 2002.

Beville, "Virtual Dementia Tour Helps Sensitize Health Care Providers," *American Journal of Alzheimer's Disease and Other Dementias*, May/Jun. 2002, vol. 17, No. 3, pp. 183-190.

Beville, "Guest Editorial: The Virtual Dementia Tour: A Call to Action for Sensitivity Training," *The American Journal of Alzheimer's Disease and Other Dementias*, Sep.-Oct. 2002, vol. 17, No. 5, p. 261-262.

Aldwin et al., "Health, Illness, and Optimal Aging, Biological and Psychosocial Perspectives," 2004, Sage Publications, Inc., London.

Butcher et al., "Depression & Dispiritedness in Later Life: A New Look at the Old," *American Journal of Nursing*, Dec. 2005, vol. 105, No. 12, pp. 52-61.

"Typical or Atypical Antipsychotics for Older Adults?" *American Journal of Nursing* Feb. 2006, vol. 106, No. 2, p. 21.

Barnes et al., "Depressive Symptoms, Vascular Disease, and Mild Cognitive Impairment," *Arch. Gen. Psychiatry*, Mar. 2006, vol. 63, pp. 273-280.

Clemons et al., "Cognitive Impairment in the Age-Related Eye Disease Study," *Arch. Ophthalmol.*, Apr. 2006, vol. 124, pp. 537-543.

Leonard et al., "Potentially Modifiable Resident Characteristics that are Associated with Physical or Verbal Aggression among Nursing Home Residents with Dementia," *Arch. Intern. Med.*, Jun. 2006, vol. 166, pp. 1295-1300.

"Global Caregiving Cost of Alzheimer's Tops $248 Billion Worldwide," http:/www.mcknights.com, Jul. 18, 2006.

"Boomer Poll Shows High Alzheimer's Anxiety," http://www.third-age.com, 2007.

2007 Task Force on Aging Research Funding, Alliance for Aging Research, 2007, Washington, D.C.

* cited by examiner

SYSTEMS AND METHODS FOR SIMULATING EFFECTS OF AGE-RELATED COGNITIVE OR PHYSICAL DECLINE

FIELD OF THE DISCLOSURE

Embodiments of the inventive concepts disclosed herein relate generally to the field of simulating effects of a medical condition. More particularly, embodiments of the inventive concepts disclosed herein relate to simulating effects of age-related cognitive or physical decline, such as dementia for example, to promote greater sensitivity to persons suffering from associated conditions.

BACKGROUND

Age-related cognitive or physical decline can take many forms as individuals age. Examples of such decline include mobility impairments and the impairment in the ability to process, respond, and remember information. An example of age-related cognitive or physical decline is dementia. Dementia can relate to one or more conditions in which an individual gradually loses the ability to think, remember, make decisions, solve problems, or otherwise perform daily activities normally. An individual suffering from dementia may become easily confused and experience a decline in intellectual functioning that affects physical and emotional interaction, such as getting dressed, eating, or responding to stimuli. Symptoms of dementia can include personality changes, emotional problems, memory lapses, decreased ability to verbally communicate, and physical conditions such as eyesight deterioration, arthritis, and other sensory deterioration. Other examples of age-related cognitive or physical decline can include mobility impairments due to joint and muscle pain and weakness.

The two major types of degenerative (non-reversible) dementia are Alzheimer's disease and vascular dementia (loss of brain function due to a series of small strokes). The two diseases often occur together. Certain drugs can be used to treat some symptoms of dementia, but are often used to slow down effects as they cannot cure dementia or repair brain damage. Effects of dementia may worsen over time and decrease the effectiveness of drug treatment, which may result in a caretaker using an inappropriate or harmful drugs or amount of drugs to sedate or otherwise attempt to treat the individual.

Many individuals with dementia are cared for at home by family members, friends, other acquaintances, or paid medical personnel. Often caregivers are not prepared to provide the level of care needed by an individual suffering from dementia. A lack of understanding of personality changes and behavioral responses caused at least in part by dementia effects can result in frustration by the caregiver and inadequate care or even physical and emotional abuse of the individual by the caregiver.

Sensitivity training can be used to educate caregivers or otherwise help caregivers become more aware of their prejudices and have a greater awareness of particular challenges individuals suffering from dementia may face. Sensitivity training can include providing information about effects of dementia. Some sensitivity training techniques include providing information to caregivers about experiences of dementia sufferers to help caregivers develop a certain level of understanding and promote patience when interacting with individuals affected by dementia.

Other sensitivity training techniques include allowing caregivers and other interested persons to experience a simulation of some dementia effects. For example, a group simulation technique includes providing participants with tasks to perform while wearing certain components that affect the participants' physical and mental skills. The components can include popcorn kernels in a glove and/or shoe that decrease the participants' ability to sense with touch or in walking, and goggles with colored lenses that decrease the participants' eyesight. Pre-and post-tests can quantify changes in attitudes and results are tabulated. As a result of the simulation, and increased sensitivity, recommendations are reviewed with the group to help improve care of patients with dementia.

Although effective for group settings, the technique is not conducive to at-home training that can be experienced by caregivers unwilling or unable to participate in group training. In group training, for example, at least three people in addition to at least one participant are needed to conduct the training: (1) an observer, such as a behavioral professor that records participant actions and responses; (2) a facilitator that provides instructions to the participants; and (3) another facilitator that ensures the proper amount of popcorn kernels are used and other equipment is configured properly. At-home participants may experience difficulty in configuring the components. Furthermore, approximately seventy-five percent of individuals suffering from age-related cognitive or physical decline are cared for in an at-home setting. Accordingly, it is desirable for a system and method for simulating effects of an age-related cognitive or physical medical condition that can be implemented in at-home settings.

SUMMARY

In an embodiment, a system is provided for allowing a user to experience a simulation of an age-related medical condition, such as dementia. The system can include eyewear, footwear, handwear, and an audio recording. The eyewear can include two colored lenses. Each lens includes a marking that can at least partially bock central vision of the user and a lens sideguard that can at least partially block peripheral vision of the user. The footwear includes a surface that can be located adjacent to a sole of the user. The surface includes protrusions that can at least indirectly contact the sole. The handwear can impair physical sensory of the user. The audio recording is stored on a medium and includes voiced instructions and static for a first pre-set time and static for a second pre-set time. The voiced instruction identifies home-based tasks for the user to perform during the second pre-set time while wearing the eyewear, footwear, and handwear.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of certain inventive concepts disclosed herein are better understood when the following Detailed Description is read with reference to the accompanying drawings, wherein:

FIG. 2b is a side view of the eyewear of FIG. 2a;

FIG. 7b is a perspective view of the footwear of FIG. 6a;

DETAILED DESCRIPTION

Figure 1:
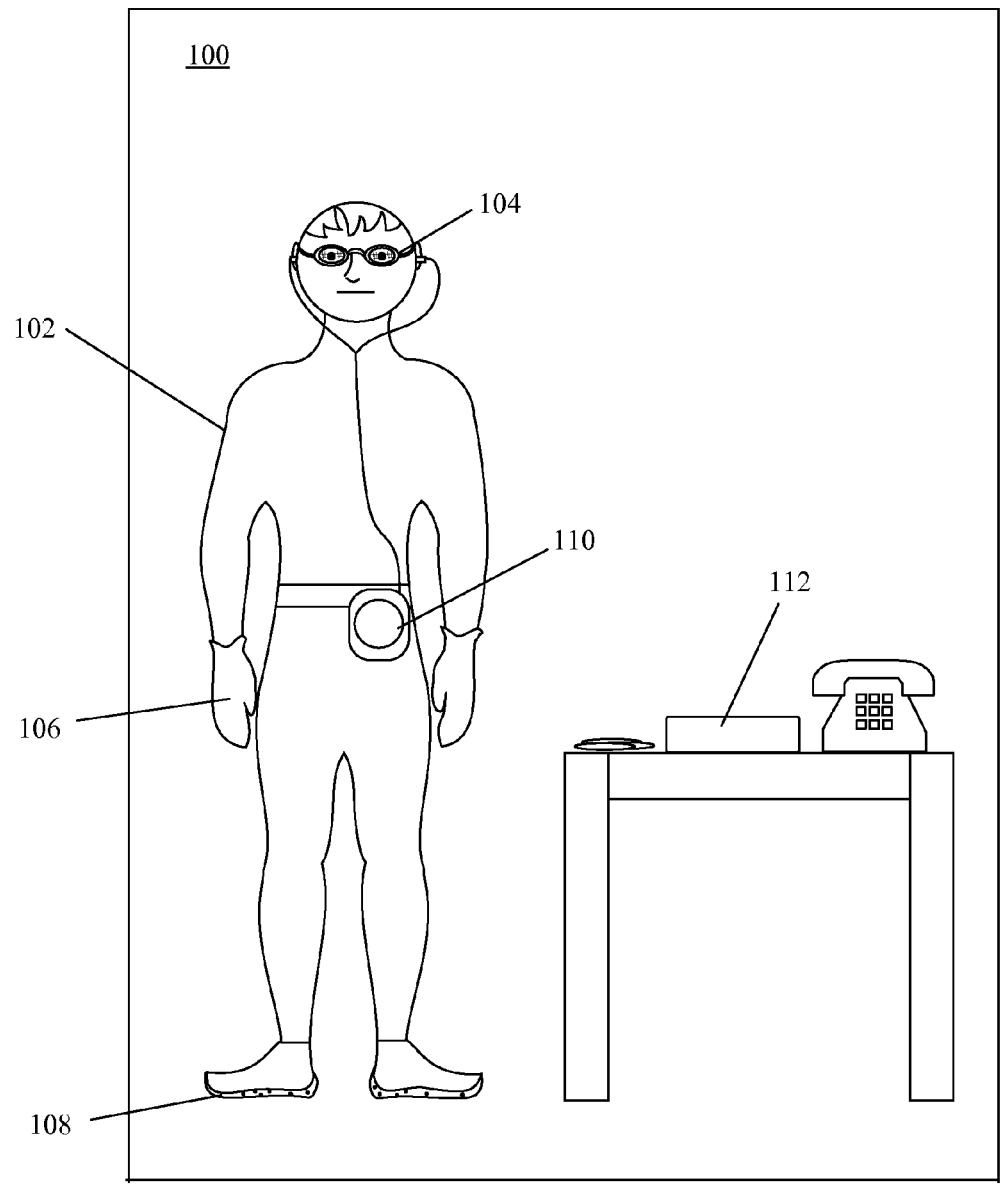
FIG. 1 shows a user wearing a system for allowing the user to experience a simulation of effects associated with dementia according to one embodiment.

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Individuals suffering from age-related cognitive or physical decline, such as dementia, experience a constellation of cognitive or physical difficulties that interfere with their ability to think, care for themselves, and perform routine activities of daily life. Symptoms of age-related cognitive or physical decline can also include personality changes, emotional difficulties, and physical impairments. Individuals suffering from age-related cognitive or physical decline are often cared for in an institutional setting or within the home such as by family members. However, family members are often ill-equipped to deal with the burden of caring for a patient with age-related cognitive or physical decline, at least in part because they do not understand the individual's cognitive and physical difficulties from the individual's perspective and the reasons for the individual's unusual or seemingly difficult behavior. Such lack of understanding can cause extreme frustration by the home-based caregiver and, in some cases, can lead to physical abuse, overmedication, or otherwise insufficient care of the individual.

Certain aspects and embodiments of the present invention relate to systems and methods for simulating effects of age-related cognitive or physical decline, such as those effects experienced upon the onset of dementia, mobility impairment, and other geriatric medical conditions. Some embodiments of the present invention are configured to be implemented in a home or other non-group environment to aid understanding, sensitivity, and increased knowledge in caring for individuals experiencing age-related cognitive or physical decline. Use of the systems and methods according to some embodiments of the present invention allows the home-based caregiver to "walk in the shoes" of the individual, thereby gaining an understanding of the disease from the individual's perspective. This better understanding of the individual's perspective may lead to greater empathy for the individual, better care, and a decreased chance of abuse of the individual. For example, lack of empathy for individuals suffering from age-relate cognitive or physical decline often results in overmedication for behavior that is "normal" to individuals or punishing the individual because the caregiver has expectations for the individual that are unrealistic.

In some embodiments, various devices are provided that impair at least part of a user's sensory skills as they perform tasks typically performed by a person in a home or residence setting. The impairment of sensory skills can correspond to impairments often experienced by individuals having age-related cognitive or physical decline. Tests or other feedback material may be provided to assist users in understanding the experiences of individuals having age-related cognitive or physical decline. Some embodiments of the present invention assist users in understanding individuals affected by age-related cognitive or physical decline to promote understanding and sensitivity toward such individuals. A greater understanding may result in improved care of such individuals and improved methods for caring for such individuals.

Systems according to various embodiments of the present invention include various devices that can be used by users to simulate the effects of age-related cognitive or physical decline in an at-home or non-group setting. FIG. 1 illustrates one embodiment of an at-home or non-group setting 100 in which a user 102 is wearing devices according to some embodiments of the present invention for simulating the effects of age-related cognitive or physical decline. The user 102 may be anyone interested in simulating the effects of age-related cognitive or physical declines in the at-home or non-group setting 100. In some embodiments, the user 102 is a family member or other caretaker of an individual experiencing age-related cognitive or physical decline The devices can include eyewear 104, handwear 106, footwear 108, and an audio recording associated with a media device 110. The eyewear 104 can be configured to impair vision of the user 100. The handwear 106 can be configured to impair manual dexterity or tactile sensation of the user 100. The footwear 108 can be configured to introduce pain and/or tingling sensation at the sole of the user's feet. The audio recording can be configured to impair the user's auditory skills and provide instructions for performing tasks, such as home-based tasks. The audio recording can be stored on a medium associated with the media device 110 that includes headphones that are wearable by the user 100 for providing the audio from the recording to the user 100.

Some embodiments include a guidebook 112 that includes an instruction manual and/or pre- and post-tests that aid in allowing the simulation to occur in the at-home or non-group setting 100. The instruction manual can include information on how to configure the devices to simulate certain age-related cognitive or physical decline. Pre-tests and post-tests can include questions to promote the user's simulation experience by highlighting particular issues, prejudices, or misconceptions commonly associated with individuals experiencing age-related cognitive or physical decline. In some embodiments, the guidebook 112 includes discussion questions or issues to consider when caring for an individual experiencing age-related cognitive or physical decline.

The devices can be positioned on the user 102 to simulate the effects of age-related cognitive or physical decline, such as for example those caused by dementia. The eyewear 104 can be coupled to the user 102, such as by using an elastic headband or resting part of the eyewear on the user's ears and nose. The handwear 106 may be gloves, mittens, or other coverings for wearing on the user's hands, such as by a friction or interference, or via an elastic or other means to secure the handwear 106 onto the hands of the user 102. As described in more detail below, the handwear 106 may be relatively thick and/or include protrusions that contact the user's skin on the user's hands. For example, thick gloves may reduce the user's ability to physically feel or grasp an object and/or limit finger or hand movement. The protrusions may be configured to introduce discomfort or pain to the user 102 when the hands are used to perform tasks.

The footwear 108 may be an insert, shoe, or other material configured to contact the sole of the user's feet. In some embodiments, the footwear 108 includes protrusions configured to contact the sole of the user's feet. The protrusions may introduce discomfort or pain to the user and/or inhibit the user's ability to walk in a normal way.

The audio recording can provide instructions identifying home-based tasks, in conjunction with static, for the user 102 to perform while wearing the devices. Examples of home-based tasks include using a telephone or other communication device to make contact with another person by inputting their telephone number, counting coins, changing a channel on a television, and picking up an object using a utensil. Examples of static include confusing voices, an offset frequency of a radio station signal, music at increased or slowed speeds, and offset single sideband signals. The static may be configured to inhibit the ability of the user 102 to clearly hear the task instructions. The user 102 can perform the home-based tasks and experience the impairments similar to those experienced by individuals having age-related cognitive or physical declines.

In some embodiments of the present invention, the guidebook 112 includes instructions for configuring the devices based on effects of a medical condition causing age-related cognitive or physical decline. For example, the user 102 may wish to simulate some of the symptoms commonly associated with dementia. The guidebook 112 can include instructions for configuring the devices to specifically experience the simulation of such symptoms. Some embodiments of the present invention provide a communication system, such as a web server, that is accessible by a user device controlled by the user 102. The web server can receive an identification of symptoms that the user wishes to simulate, access data stored in memory based on the symptoms and provide instructions for configuring the devices to simulate the identified symptoms.

Various embodiments of the devices identified above can be used to simulate various medical conditions associated with age-related cognitive or physical decline. The following describes certain embodiments of the devices described above. Other embodiments, different devices, or different combinations of devices, however, can be used to simulate medical conditions associated with age-related cognitive or physical decline.

Eyewear

One common physical symptom experienced by individuals suffering from age-related cognitive or physical decline is loss of vision, such as loss of vision caused by macular degeneration or cataracts. Macular degeneration can include thinning, atrophy, or bleeding of the inner lining of the eye resulting in decreased or loss in central vision that impairs a person's ability to see details, read, and/or recognize faces. Certain embodiments of the present invention provide eyewear configured to simulate these or other vision-related symptoms.

Figure 2A:
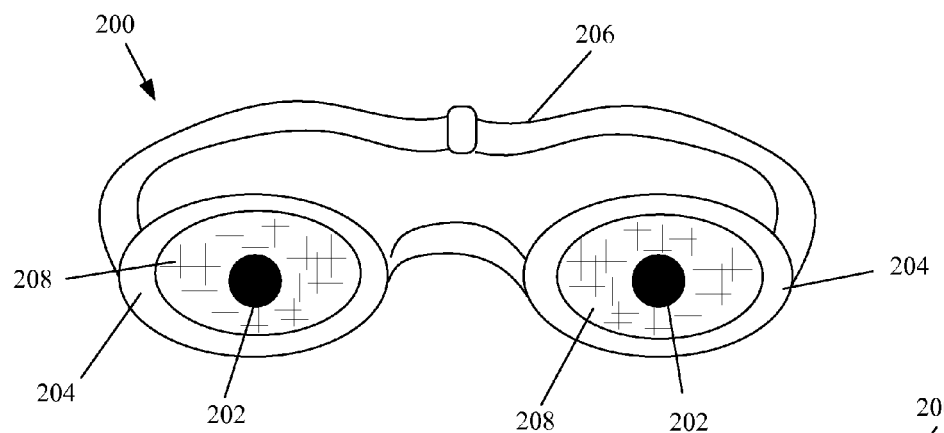
FIG. 2a is a front view of eyewear according to one embodiment.
Figure 2B:
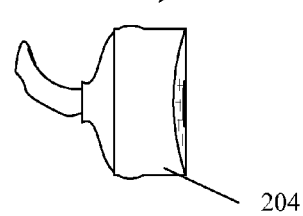
Figure 3:
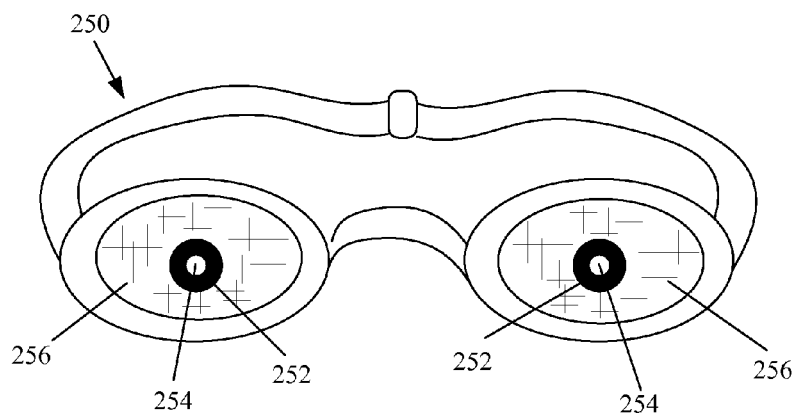
FIG. 3 is a front view of eyewear according to a second embodiment.

FIGS. 2a-3 illustrate eyewear according to certain embodiments of the present invention. The eyewear shown in FIGS. 2a-3 are goggles, but other types of eyewear, such as glasses or other eye coverings can be used. FIGS. 2a-b illustrate goggles 200 that include markings 202 at least partially blocking central vision of a user and a lens sideguard 204 at least partially blocking peripheral vision of the user. FIG. 3 illustrates goggles 250 that include a marking 252 with an opening 254 that is configured to at least partially block central vision of the user.

FIG. 2a is a front view of goggles 200 showing an elastic band 206 for securing or otherwise coupling the goggles 200 to the user. The goggles 200 include two lenses 208 for covering each eye of a user. In some embodiments, the goggles 200 include one lens for covering one or both eyes. For example, the goggles may be similar to a swimmer's mask and configured to have one lens to cover both eyes and, optionally, portions of the user's nose or other facial features. Each of the lenses 208 shown in FIG. 2a includes coloring on at least part of the lens. The coloring may be at least partially transparent but inhibit the user's vision. For example, the coloring may be yellow or light yellow that shades or prevents certain wavelengths of light from reaching the user's eyes, thereby partially inhibiting the user's vision. The coloring may simulate yellowing of an aging eye that can decrease vision.

Each of the lenses 208 may also include the markings 202 located on the lenses to at least partially block central vision of the user. The markings 202 may be a dark, such as black, circle or other shape of a pre-selected diameter. In some embodiments, the markings 202 have a diameter of about 0.5 inches to about 0.75 inches. However, any diameter configured to at least partially block central vision of the user is acceptable.

FIG. 2b is a side view of the goggles 200 and illustrates the lens sideguard 204. The lens sideguard 204 can be configured to at least partially block peripheral vision of the user to simulate peripheral vision loss experienced by individuals suffering from age-related cognitive or physical decline. The lens sideguard 204 can be any length. An example of lengths of a lens sideguards according to some embodiments of the present invention is about 0.5 inches to about 1.5 inches.

FIG. 3 illustrates another embodiment of eyewear that includes goggles 250. The goggles 250 include two lenses 256 that each includes coloring of at least part of the lenses 256 and the marking 252. The marking 252 may be substantially annular in shape and include the opening 254 for allowing light to pass to the user's eye, but block at least part of the user's central vision. For example, the opening 254 can simulate the macular degeneration often experienced by those suffering from age-related cognitive or physical decline, such as by limiting vision except through the relatively small opening 254. The opening 254 may be any size for limiting central vision of the user. In some embodiments, the opening 254 has a diameter of about 0.1 inches to about 0.25 inches. Other diameters may be used in some embodiments. Some embodiments of goggles 250 include a lens sideguard for at least partially blocking peripheral vision of the user. Other embodiments of goggles 250 do not include the lens sideguard. For example, some conditions for which the user simulates may not need to simulate a partial block of the peripheral vision of the user.

Handwear

Another common physical symptom experienced by individuals suffering from age-related cognitive or physical decline is loss of physical sensory in fingers and joint pain limiting mobility, such as joint pain caused by arthritis. For example, some individuals lose the ability to grasp objects with sufficient force or control objects using their hands. Certain embodiments of the present invention provide handwear configured to simulate these or other physical sensory problems.

Figures 4, 5:
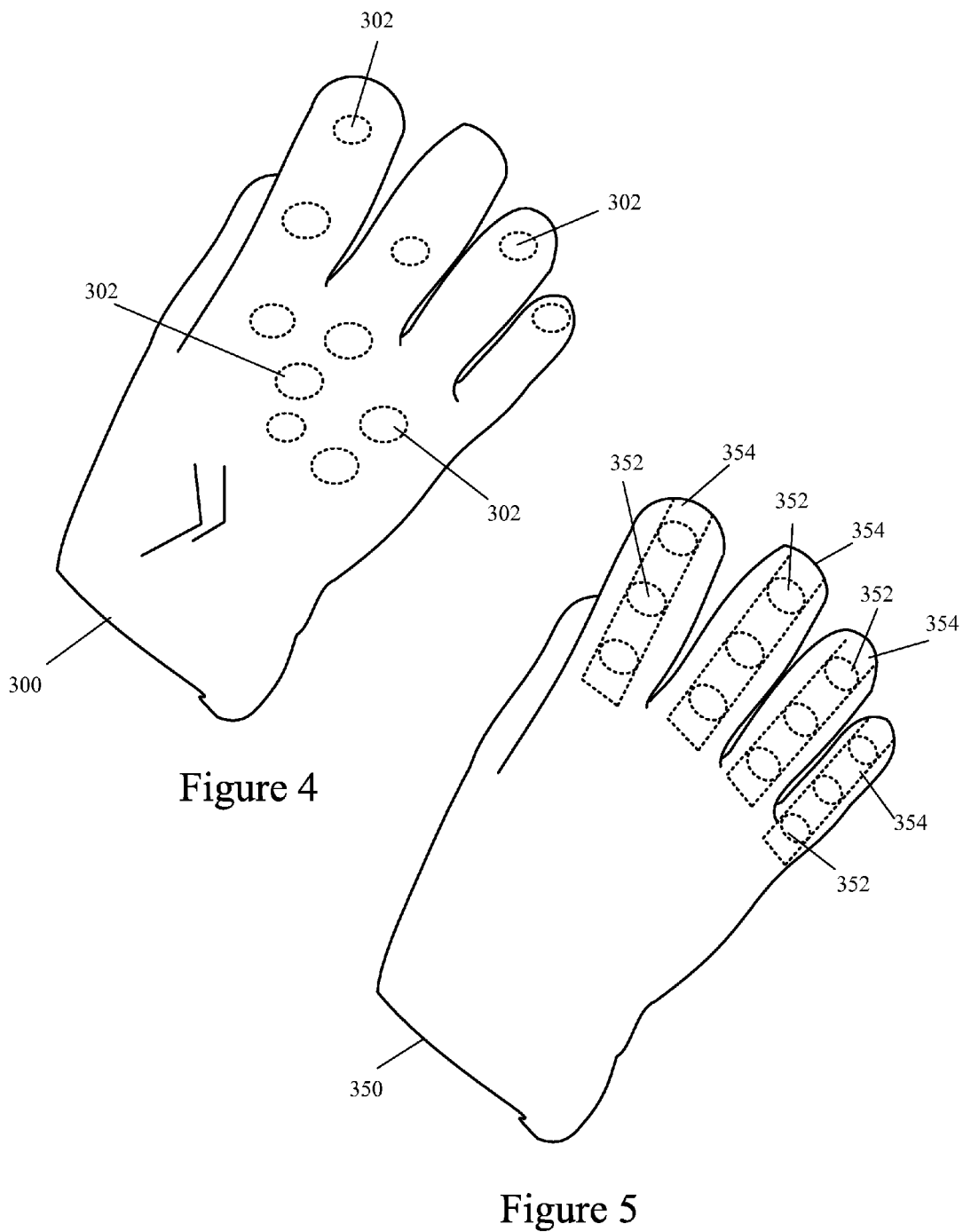
FIG. 4 is a perspective view of handwear according to one embodiment.
FIG. 5 is a perspective view of handwear according to a second embodiment.
Figure 6:
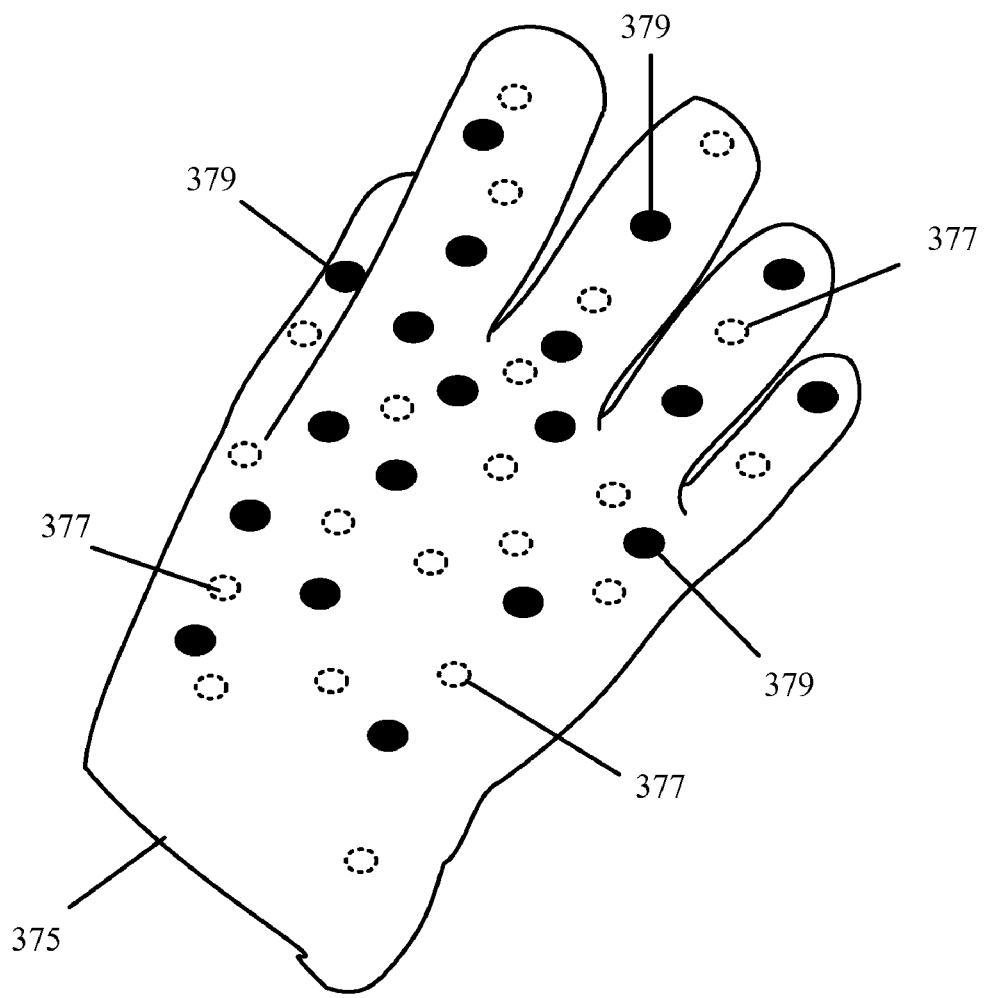
FIG. 6 is a perspective view of handwear according to a third embodiment.

FIGS. 4-6 illustrate handwear according to some embodiments of the present invention. In the embodiments shown, the handwear is gloves, but other forms of hand coverings may be used. FIG. 4 illustrates a glove 300 with protrusions 302 located in various positions relative to the glove. FIG. 5 illustrates a glove 350 having protrusions 352 associated with strips 354 coupled to the glove 350. FIG. 6 illustrates a glove 375 having inner protrusions 377 and outer protrusions 379. Other handwear embodiments may be relatively thick gloves without protrusions that are configured to limit the user's manual dexterity and/or tactile sensation.

FIG. 4 shows the glove 300 with protrusions 302, shown with dotted lines, located within the glove 300. For example, each of the protrusions 302 is coupled to an inner layer of the glove 300 and extends inwardly. The protrusions 302 can be configured to contact the user's hands to impair the user's sensory skills, such as feeling using fingers and/or movement. In some embodiments, the protrusions 302 have a rounded surface. In other embodiments, the protrusions 302 have a square or irregular surface configured to introduce pain or discomfort when the user grasps objects. Although eleven protrusions 302 are shown in FIG. 4, any number of the protrusions 302 can be used. The protrusions 302 may be different sizes or be same size. In some embodiments, the protrusions 302 can have a length in one direction of between about three inches to about five inches.

In some embodiments, the glove 300 is a relatively thick glove. A relatively thick glove may simulate the difficulty individuals suffering from age-related cognitive or physical decline face when attempting to grasp objects or otherwise perform normal daily tasks.

FIG. 5 shows a glove 350 with protrusions 352 associated with strips 354. Each of the strips 354 can be attached, or otherwise coupled, to an inner layer of the glove 350 and each of the protrusions 352 can be attached, or otherwise coupled, to one of the strips 354. For example, the strips 354 are sewed or glued to the inner layer of the glove 350 and the protrusions 352 are sewed or glued to the strips 354. Strips 354 may be made from any suitable material, an example of which is Step Guard™. In some embodiments, one side of the strips 354 is Velcro™ or other similar material that is configured to temporarily be coupled to the inner wall of the glove 350. For example, the location of the strips 354 within the glove 350 can be changed depending on the medical conditions simulated. FIG. 5 illustrates the strips 354 along the fingers of the glove 350 to simulate the difficult often experienced by certain individuals suffering from age-related cognitive or physical decline in sensing objects using their fingers.

FIG. 6 shows a glove 375 with inner protrusions 377 shown with dotted lines and outer protrusions 379 shown as darkened dots. The inner protrusions 377 may be coupled to an inner portion of the glove 375 and be configured to at least indirectly connect the hands of a user and cause discomfort, loss of feeling, and/or pain when, for example, the user attempts to grasp and object. The outer protrusions 379 may be coupled to an outer portion of the glove 375 and be configured to cause discomfort, loss of feeling, and/or pain to a user. In the embodiment shown in FIG. 6, the inner protrusions 377 and outer protrusions 379 are coupled randomly to the inner portion and outer portion of the glove 375, respectively. In some embodiments, the inner protrusions 377 are spaced apart evenly, at least roughly, from each other. The outer protrusions 279 may also be spaced apart evenly, at least roughly from each other. In some embodiments, the glove 375 is a cotton glove and the inner protrusions 377 and outer protrusions 379 are made from rubber and coupled to the glove 375 using adhesive, tape, screws, nails, tacks, or other connection means.

Footwear

Another common physical symptom experienced by individuals suffering from age-related cognitive or physical decline is neuropathy causing foot or other sensory disorders. Neuropathy may be a degeneration of the individual's nervous system, decreasing their sensory skills in feet, and/or causing discomfort or pain in their feet. Certain embodiments of the present invention provide footwear configured to simulate these or other physical sensory problems.

Figure 7A:
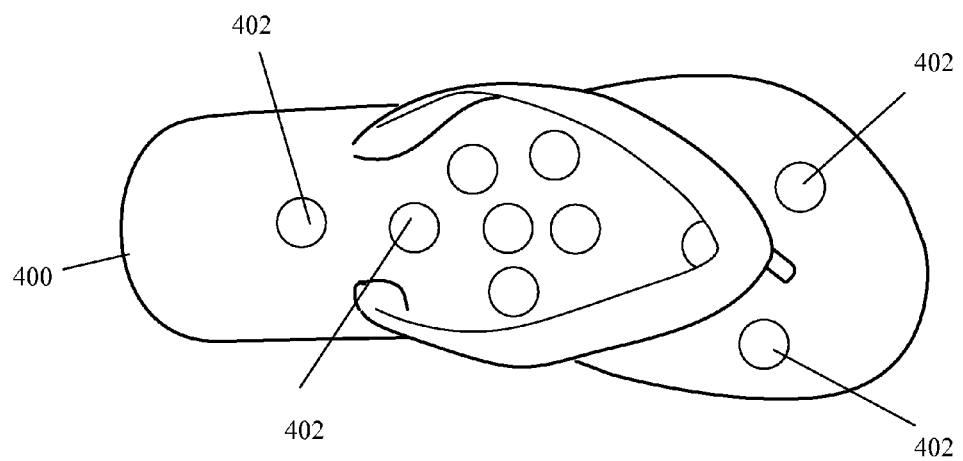
FIG. 7a is a top view of footwear with protrusions according to one embodiment.
Figure 7B:
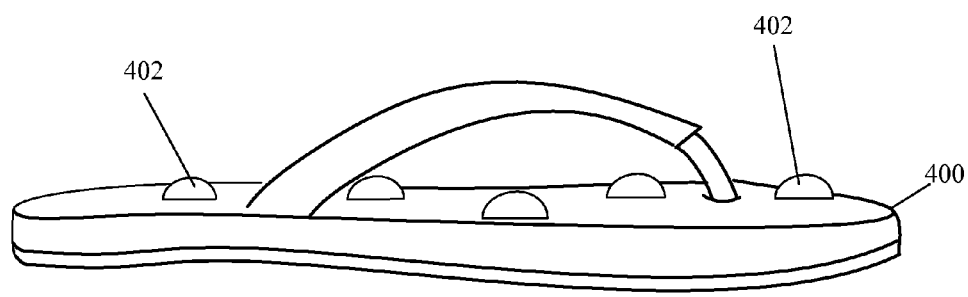
Figure 8:
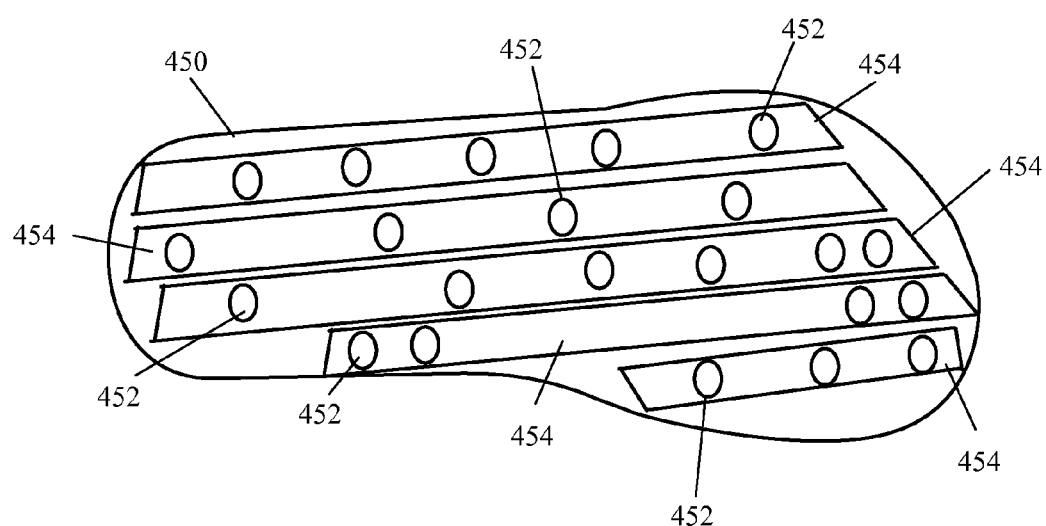
FIG. 8 is a top view of footwear with protrusions according to a second embodiment.

FIGS. 7a-8 illustrate footwear according to some embodiments of the present invention. FIGS. 7a-b illustrate a flip-flop 400 that can be worn by a user and include protrusions 402 to simulate discomfort or paid commonly associated with neuropathy. FIG. 8 illustrates a shoe insert 450 that includes protrusions 452 associated with strips 454. Footwear, such as the footwear shown in FIGS. 7a-8, according to various embodiments of the present invention is configured to simulate the effects of neuropathy or other conditions associated with age-related cognitive or physical decline.

FIGS. 7a-b show footwear that is the flip-flop 400 capable of being worn by a user. The flip-flop 400 includes protrusions 402 that may be rounded or other shaped objects attached or otherwise coupled to the flip-flop 400. The protrusions 402 can be configured to make contact with the user's sole and cause discomfort or pain that is a simulation of the pain or discomfort that may be experienced by individuals suffering from age-related cognitive or physical decline. Any number of protrusions 402 can be used. Furthermore, the protrusions 402 can be located anywhere on the surface of the flip-flop 400 to contact the sole of the user. In the embodiment shown in FIGS. 7a-b, the protrusions 402 are located in various areas on the flip-flop 400. In some embodiments, the protrusions 402 are concentrated in one or more areas, such as at the toe end of the flip-flop 400 and/or the heel end of the flip-flop 400 to contact the toes and/or heel of the user respectively. Although the footwear in FIGS. 7a-b is shown as a flip-flop, other types of footwear, such as a shoe, shoe insert, or otherwise, may be used.

FIG. 8 shows the shoe insert 450 with protrusions 452 coupled to strips 454. Each of the strips 454 can be attached, or otherwise coupled, to a surface of the shoe insert 450 and each of the protrusions 452 can be attached, or otherwise coupled, to one of the strips 454. For example, the strips 454 are sewed or glued to shoe insert 450 and the protrusions 452 are sewed or glued to the strips 454. Strips 454 may be made from any suitable material, an example of which is Step Guard™. In some embodiments, one side of the strips 454 is Velcro™ or other similar material that is configured to temporarily be coupled to the shoe insert 450. The location of the strips 454 can be changed depending on the medical conditions simulated. FIG. 8 illustrates the strips 454 along the length of the shoe insert 450. In some embodiments, the strips 454 extend along a portion of the length of the shoe insert 450. The protrusions 452 may be located randomly along with the strips 454. In some embodiments, the protrusions 452 are spaced evenly along strips 454 or located in certain areas of the strips 454, such as the toe and/or heel end of the shoe insert 450, and not others, such as the arch of the shoe insert 450.

Audio Recording

Another common physical symptom experienced by individuals suffering from age-related cognitive or physical decline is hearing loss or the inability to distinguish and/or process sounds, which may, in some cases, be caused by dementia or other age-related medical condition. Certain embodiments of the present invention provide audio recording configured to simulate these or other physical sensory problems. Audio recordings according to some embodiments may also include instructions for performing various home-based tasks while wearing some or all of the devices disclosed herein to simulate effects of age-related cognitive or physical decline.

Figure 9:
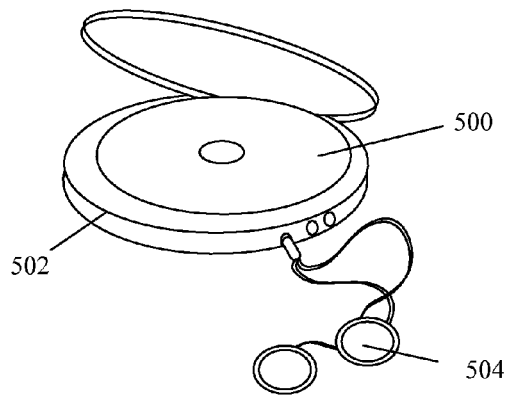
FIG. 9 shows a storage medium that is a compact disk on which an audio recording is stored according to one embodiment.

FIG. 9 illustrates one embodiment of an audio recording stored on a medium, such as a compact disc (CD) 500 that is configured to provide static and/or instructions via a media player, such as CD player 502. The CD player 502 may be associated with headphones 504 or other speakers that are configured to be placed in the user's ear to deliver the static and instructions. As stated above, the audio recording may be stored on any suitable medium. An example of such a medium includes a computer-readable medium, such as random access memory, read only memory, optical storage, magnetic storage, and the like. For example, the audio recording may be code in a readable or executable format, such as MP3, and configured to be provided to the user via a processor-based device, such as an MP3 player.

Figure 10:
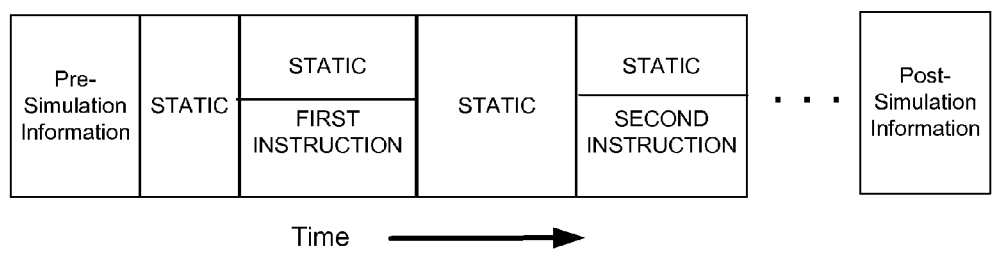
FIG. 10 is a time graph of an audio recording according to one embodiment.

The audio recording can include static to simulate the difficulty individuals suffering from age-related cognitive or physical decline experience in hearing and understanding daily sounds, such as speech. Examples of static include a radio station signal received at an offset frequency, dead-air signal, a single sideband signal received at an offset frequency, and various randomly selected noises and sounds. FIG. 10 is a time-graph of an audio recording according to one embodiment of the present invention. The time-graph includes pre-simulation instructions for a first amount of time. The pre-simulation instructions can include instructions for coupling the devices to the user and/or pre-simulations tests, information, or other directions. The first amount of time may be between fifteen seconds and ten minutes.

Static may be provided during a second amount of time. The second amount of time may be between fifteen seconds and three minutes. In some embodiments, the second amount of time may be less than fifteen seconds or greater than three minutes.

The time-graph includes static and a first instruction for performing a task for a third amount of time that may be the same, greater, or less than the first amount of time. The instructions may be for performing a home-based task. Examples of home-based tasks include (1) phone a local friend; (2) get a plastic cup and fill it half full with water and drink it; (3) clean the kitchen counter with a wet paper towel or dish towel; (4) move all the towels and washcloths onto a bed and make sure they stay folded; (5) set a table for four using plates and utensils; (6) find a button-up shirt, put it on, and button three buttons; and (7) write a three sentence note to your family. Other home-based tasks include (1) find a pair of pants with belt loops, find a belt, and put the belt through the belt loops; (2) find and count out thirty-five cents in change and leave the change on the table; (3) write down seven things you might buy at a grocery store and number them on a piece of paper; (4) apply butter to a piece of bread; and (5) find a sheet with dots on it and connect the dots using a pen.

An instruction for performing a task, along with static, can be provided to the user during the third amount of time. The user can perform, or attempt to perform the task during the fourth amount of time during which the audio recording includes static. The fourth amount of time may be any desired amount of time, such as equal, greater, or less than the first amount of time. In one embodiment, the fourth amount of time is five minutes. During a fifth amount of time, a second instruction for performing a task, and static are provided. The task may be a home-based task for a user to perform during a subsequent amount of time during which the static is provided. The process may repeat until a pre-set number of instructions are provided and the user is given an opportunity to perform the pre-set number of tasks associated with the instructions. An example of a pre-set number of tasks is six. In some embodiments, the instructions for performing the tasks are provided to the user all together instead of during separate amounts of time. After the instructions are provided and the user is given an opportunity to perform tasks associated with the instructions while receiving static, post-simulation information may be provided to the user in some embodiments. The post-simulation information can include directions for decoupling the devices from the user, post-tests, and/or issues to consider based on the simulation and caring for individuals suffering from age-related cognitive or physical decline. Using various embodiments of the present invention users can simulate, in an at-home or other non-group environment, the effects of conditions associated with age-related cognitive or physical decline, such as dementia.

Various embodiments of the present invention can allow a family member to wear one or more devices and listen to an audio recording (for example, but not limited to, a compact disc) that instructs the family member through the entire sensitivity training process within the home or non-group environment. The instructions include tasks that are readily available in most homes. A guidebook or access to other information can be provided to assist users in understanding their simulation experience.

EXAMPLES

The following are examples of using certain embodiments of the present invention for simulating the effects of age-related cognitive or physical decline. The examples are provided for illustrative purposes only.

In one embodiment, goggles are provided that include a lens sideguard to at least partially block peripheral vision. A black dot having a 0.5 inches diameter and made of black photograph album paper is glued to each lens of the goggles to simulate macular degeneration. The lenses of the goggles are painted using transparent glass paint, such as PermEnamel™, having a yellow or yellow-like color to simulate the yellowing of an aging eye by making vision difficult. Medium shoe sized vinyl, low pile Step Guard™ is provided and placed, pile side up, inside the user's shoe. The insert can simulate neuropathy that creates pain when walking and arthritic pain in the feet.

Two sets of relatively thick latex gloves can be provided. One glove can be labeled "R" for right and the other glove can be labeled "L" for left for each set. Each glove of one set includes strips of vinyl, low pile Step Guard™. One strip may be located on the little, middle, index, and thumb fingers. In some embodiments, each strip runs from the tip of the respective finger to the middle of the hand. The strips can be attached to gloves of the first set with a crimper to secure them to the respective glove. The second set of gloves may be inner gloves to prevent the strip from being in direct contact with the skin. The two sets of gloves can be configured to simulate loss of manual dexterity, arthritis, and/or sensory loss. An audio recording on a CD is also provided with instructions, static, and combination of instructions and static.

The user can attach the goggles to his or her head, put on the gloves, put on his or her shoes with the shoe insert in place, and place headphones connected to a CD player in which the CD is located. A guidebook is provided. The guidebook can include two laminated flaps bound at the sides and configured to swing out to the left and right respectively. One flap may be for "before" the simulation and the other flap may be for "after." The audio recording can have an instruction to open the "before" flap. A page is provided with numbers 1-5 and a Y (for Yes) and an N (for No) next to each number. The audio recording includes five yes or no questions that are provided to the user and the user can record their answers for each question on the page. In some embodiments, a dry erase pen is provided for answering questions, allowing the guidebook to be reused for later simulations. Examples of questions include the following:

1. From a physical standpoint, do you feel capable of carrying out simple tasks?
2. Do you feel relaxed?
3. Are behavioral problems experienced by individuals with dementia justified?
4. Do you feel like you understand the emotional needs of individuals with dementia?
5. Do you feel like individuals you know with dementia receive the care they need?

The audio recording provides tasks for the user to complete while providing static that can include background noise. The tasks can include home-based tasks that are commonly performed at home or in a similar environment. After completing all of the tasks in a time allotted, such as ten minutes, the user removes the goggles, gloves, and inserts. The audio recording instructs the user to open the "after" tab and provided with the same five questions. After completing the questions, the user is instructed to compare their answers on the "before" and "after" tabs.

The guidebook can include a discussion guide that includes subjective questions and other topics for the user to consider, either individually or with other family members. Users may be asked to write down their answers to the subjective questions and/or discuss the topics and questions with family members. The discussion guide can also include recommendations for caring for those experiencing age-related cognitive or physical decline, such as declines caused by dementia. Resources may also be listed for the user or family members to obtain additional information and guidance. The simulation and subsequent discussion can promote patience and understanding in caring or otherwise interacting with individuals suffering from age-related cognitive or physical declines. In some embodiments, the guidebook includes two books: (1) pre- and post-tests; and (2) the discussion guide.

General

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A system for allowing a user to experience a simulation of effects of an age-related medical condition, the system comprising:
   (a) eyewear comprising two colored lenses, each of the two colored lenses comprising:
      (i) a marking configured to at least partially block central vision of the user; and
      (ii) a lens sideguard configured to at least partially block peripheral vision of the user;
   (b) footwear comprising a surface configured to be located adjacent to a sole of a foot of the user, the surface comprising a plurality of protrusions configured to at least indirectly contact the sole;
   (c) handwear configured to impair at least one of manual dexterity or tactile sensation of the user, the handwear comprising a surface configured to be located adjacent to a hand of the user, the surface comprising a plurality of protrusions configured to at least indirectly contact skin on the hand; and
   (d) an audio recording stored on a medium, the audio recording comprising voiced instructions and static for a first pre-set time and static for a second pre-set time, wherein the voiced instructions comprise home-based tasks for the user to perform during the second pre-set time while wearing the eyewear, the footwear, and the handwear.

2. The system of claim 1, wherein the audio recording further comprises:
   a pre-test, the pre-test comprising a plurality of pre-test questions related to the age-related medical condition and configured to be answered prior to the user's performance of the home-based task; and
   a post-test, the post-test comprising a plurality of post-test questions related to the age-related medical condition and configured to be answered after the user's performance of the home-based task.

3. The system of claim 1, wherein the marking has a diameter of about 0.5 inches to about 0.75 inches.

4. The system of claim 1, wherein the marking comprises an opening.

5. The system of claim 4, wherein the marking comprises a diameter of about 0.1 inches to about 0.25 inches.

6. The system of claim 1, wherein the handwear further comprises at least one strip and a protrusion configured to be located adjacent to a finger of the user.

7. The system of claim 1, wherein the home based tasks comprise at least one of:
   calling another person using a telephone;
   counting coins; or
   fastening a button.

8. A method for experiencing a simulation of physical and cognitive effects associated with an age-related medical condition, comprising:
   (a) coupling eyewear to a head of the user, the eyewear comprising two colored lenses, each of the colored lenses comprising:
      (i) a marking impairing central vision of the user; and
      (ii) a lens sideguard at least partially blocking peripheral vision of the user;
   (b) coupling footwear to a foot of the user, the footwear comprising a surface located adjacent to a sole of the foot, the surface comprising a plurality of protrusions at least indirectly contacting the sole;
   (c) coupling handwear to a hand of the user, the handwear impairing at least one of manual dexterity or tactile sensation, the handwear comprising a surface located adjacent to the hand of the user, the surface comprising a plurality of protrusions at least indirectly contacting skin on the hand;
   (d) receiving a voiced instruction from an audio recording stored on a medium, the voiced instruction identifying a home-based task to perform;
   (e) performing the home-based task while receiving static from the audio recording, wherein the static comprises one or more sounds configured to inhibit hearing the voiced instruction;
   (f) receiving questions, the questions being associated with individuals suffering from the age-related medical condition; and
   (g) answering the questions to evaluate the user's perception of the individuals.

9. The method of claim 8, further comprising:
receiving a pre-test, the pre-test comprising a plurality of pre-test questions related to the age-related medical condition and configured to be answered prior to the user's performance of the home-based task.

10. The method of claim 8, further comprising:
receiving from a discussion guide at least one of:
- a topic for discussion;
- a recommendation for caring for an individual experiencing the age-related medical condition; or
- a resource to receive additional information associated with the age-related medical condition.

11. The method of claim 8, wherein the marking comprises an opening.

12. The method of claim 11, wherein the opening comprises a diameter of about 0.1 inches to about 0.25 inches.

13. The method of claim 8, wherein the home based task comprises at least one of:
- calling another person using a telephone;
- counting coins; or
- fastening a button.

* * * * *